Figure 1:
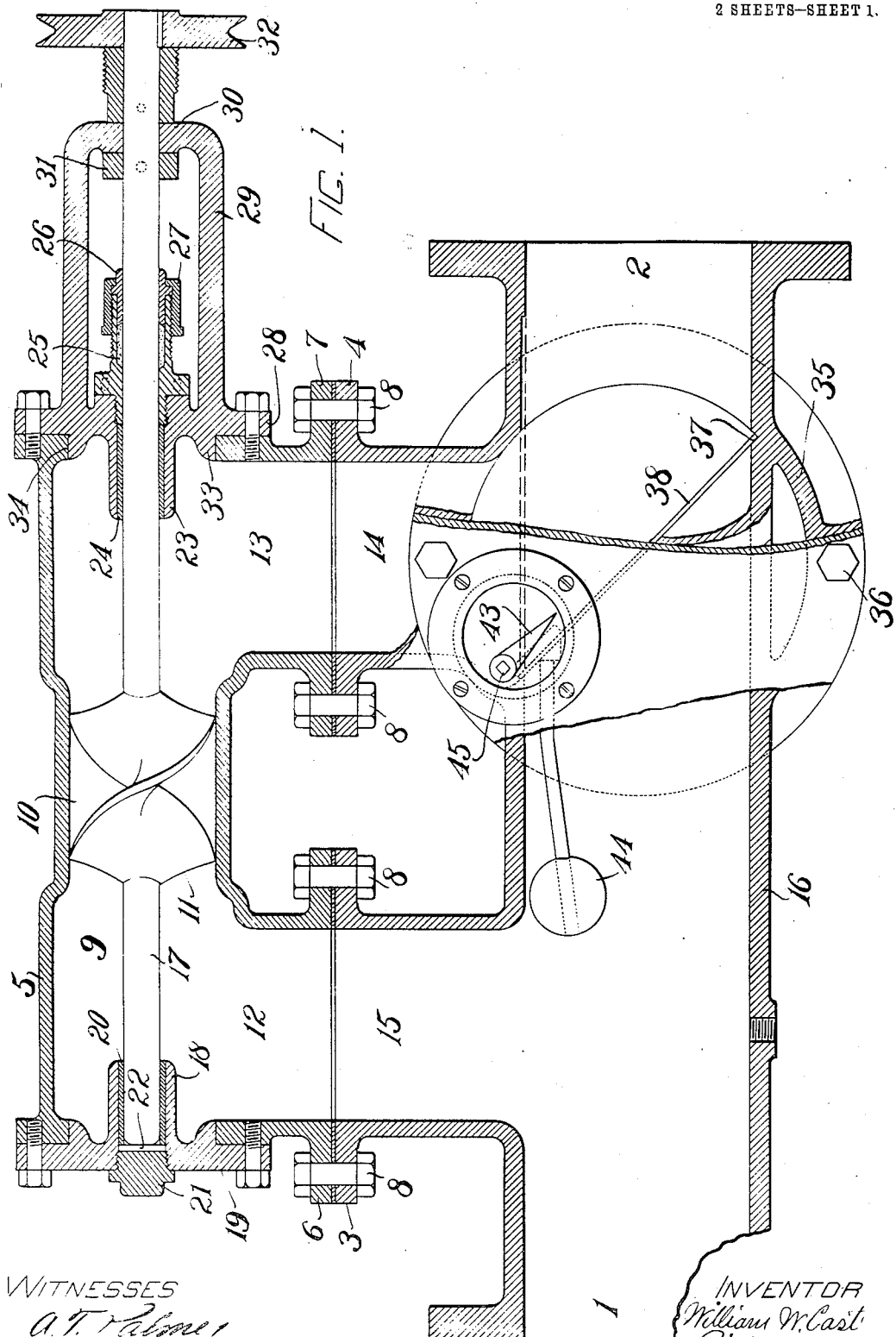

W. W. CASTLE.
LIQUID IMPELLING OR CIRCULATING DEVICE.
APPLICATION FILED JULY 10, 1908.

999,092.

Patented July 25, 1911.

2 SHEETS—SHEET 1.

WITNESSES

INVENTOR

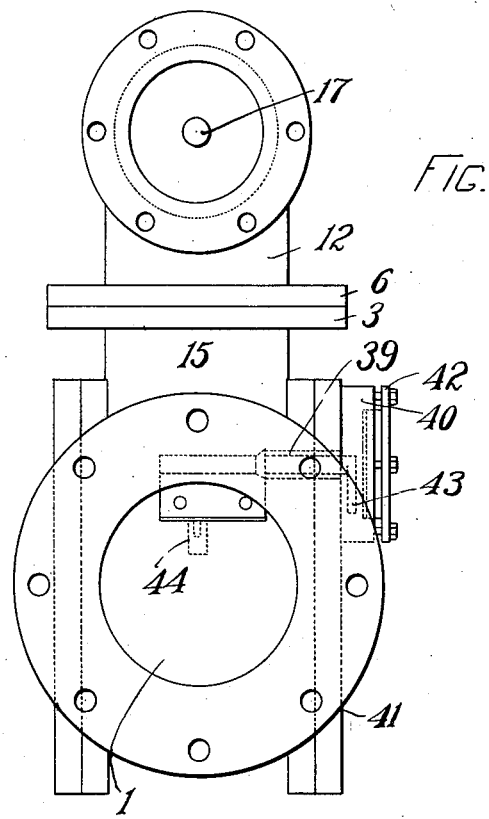
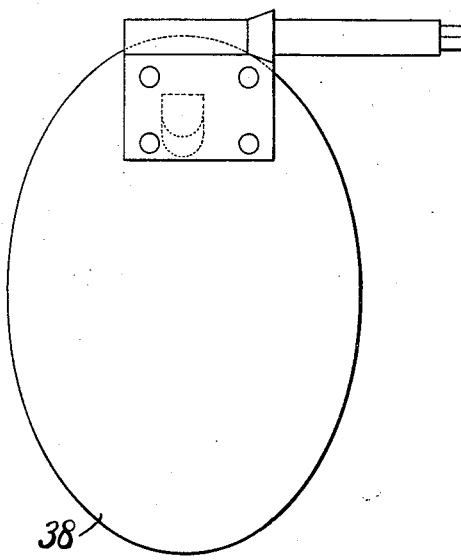

UNITED STATES PATENT OFFICE.

WILLIAM W. CASTLE, OF EAST WEYMOUTH, MASSACHUSETTS, ASSIGNOR TO WILLIAM J. CARLIN AND DANIEL J. KILEY, BOTH OF BOSTON, MASSACHUSETTS.

LIQUID IMPELLING OR CIRCULATING DEVICE.

999,092.  Specification of Letters Patent.  Patented July 25, 1911.

Application filed July 10, 1908. Serial No. 442,985.

*To all whom it may concern:*

Be it known that I, WILLIAM W. CASTLE, a citizen of the United States, residing in East Weymouth, county of Norfolk, Commonwealth of Massachusetts, have invented certain new and useful Improvements in Liquid Impelling or Circulating Devices, of which the following is a specification, reference being had to the drawings accompanying the same and forming a part thereof.

This invention relates to that class of devices for causing a mechanically induced circulation of liquid in pipes or mains, and has for its object to provide a device of this character which will be supported by the pipe or main, as also to provide the circulating device with a valve which will automatically change its position so as to close the direct passageway for the normal flow when the circulating propeller is started, but will move automatically to open the direct passageway when the propeller stops, and in so doing will close the by-pass inlet to said direct passageway.

In the accompanying drawings Figure 1 is a longitudinal section of a liquid circulating device embodying the present invention. Fig. 2 is an end view thereof, and Fig. 3 is a detail view of an automatic valve which is employed.

Referring to the drawings, 16 denotes a section of a pipe or main for the direct or natural flow of the liquid, and which, in such normal flow, will enter at the inlet end 1, and escape at the outlet end 2 of the pipe or casing 16. Supported by the pipe or casing 16 is a casing 5 provided with hollow bosses 12 and 13 which register with similar bosses 15 and 14 on the casing 16. The boss 15 is provided with a flange 3, the boss 14 with a flange 4, the boss 12 with a flange 6, and the boss 13 with a flange 7, these bosses being rigidly secured together by means of bolts 8 passing therethrough, so as to rigidly attach the casing 5 to the pipe or casing 16.

The casing 5, which serves as a by-pass from and to the chamber of the pipe section 10, is provided at one end with a head 19 removably secured thereto and having an inwardly extending boss 18 which serves as a bearing for one end of the shaft 17 carrying the rotary propeller 11 arranged in the contracted portion 10 of the chamber 9 of said casing 5, said boss 18 being preferably provided with a bushing 20. Removably attached to the opposite end of the casing 5 is a frame 29 having an inwardly extending boss 23 which affords one of the bearings for the shaft 17 and which is preferably provided with a bushing 24, the said shaft also having a bearing in the part 30 of said frame 29 and being provided at its outer end, which projects beyond said frame 29, with a driving pulley 32. The attachment of the frame 29 to the casing 5 is preferably effected by screws passing through the flange 28 with which the said frame is provided.

A thrust bearing for the propeller shaft 17 is preferably provided in the head 19, said thrust bearing, as herein shown, comprising a plug 21, screwed into said head, and a steel thrust washer 22 interposed between the end of said shaft 17 and said plug. A water-tight packing for the shaft 17 is preferably provided within the frame 29, said packing comprising a packing box 25, a packing gland 26, and a packing nut 27 threaded on the box 25 and engaging the gland 27 for the purpose of properly compressing the packing in the packing box. The frame 29 is provided at its inner end with an annular lip 33 which fits in a turned bearing 34 in the casing 5, thereby permitting the said frame to be turned to different angles, if desired.

The casing or pipe section 16 is provided with a transverse portion or flange 35 closed on each side by disks secured thereto by bolts 36, the said portion 35 forming a seat 37 for a valve 38 which is provided with a suitable stem rotatably mounted in a bearing 39. The pipe or casing 16 is provided with a boss 40 to which is secured a ring 42 inside of which is a glass disk through which an index or pointer 43, movable with the valve 38, may be observed, said index or pointer indicating the position of the valve. Attached to the valve 38 is a counterpoise or weight 44 which is designed to normally hold the valve in the position denoted by dotted lines in Fig. 1, to close the passage from the boss 14 into the chamber of the pipe or casing 16, the said valve being pivoted at 45 so that it may freely swing to the positions denoted in full and dotted lines.

When the propeller 11 is not in motion the liquid will have a direct or normal flow through the chamber of the pipe or casing 16, the valve 38 being at such time in the position denoted in dotted lines in Fig. 1, and in which position it will be held by the weight 44, as also by the flow of the liquid. When, however, the propeller 11 is set in motion it will cause an induced circulation through the chamber of the casing 5, the fluid, entering at 1 into the pipe 16, flowing through the outlet boss 15 of the said casing 16 to the chamber of the casing 5, and thence outward from said casing 5 through the outlet boss 13 and into the chamber of the pipe or casing 16 through the inlet boss 14 of the latter. This induced circulation of the liquid will automatically force the valve 38 downward from the position shown in dotted lines in Fig. 1 to the position shown in full lines therein, thereby closing the main or direct passageway through the pipe or casing 16 and opening the passageway from the chamber of the casing 5 into the exit end 2 of the said pipe or casing 16, thus causing induced or forced circulation of the liquid through the main or pipe with which the pipe section or casing 16 is connected and of which it normally forms a part in the direct circulation of the liquid.

Owing to the fact, as hereinbefore indicated, that the casing for the induced circulation and the bearings for the propeller shaft are supported by the section or casing 16 forming part of the main or pipe for the normal or direct flow of the liquid, it is evident that any expansion or contraction of the pipe or main of which the pipe 16 forms a part will not disturb the bearings for the propeller shaft 17. The thrust bearing for the shaft 17 afforded by the plug 21 and interposed steel washer 22 will effectively prevent any endwise movement of said shaft in one direction, while the collar 31, pinned to the said shaft and bearing against a portion of the frame 29, serves as a stop which will effectively prevent any endwise movement of said shaft in the opposite direction, and the said shaft will thus be securely held in bearings which will not be thrown out of alinement by any contraction or expansion of the pipe or main by which the propeller casing is supported. It will thus be seen that the casing 5, removably secured to or mounted on the pipe section 16, affords a self-contained device for the propeller shaft and its bearings, so that it may be readily placed in or dismounted from its operative position, and is conveniently accessible for repairs or adjustment; while the propeller shaft, with its thrust bearing at one end, may be conveniently placed in working position or may be readily removed when desired without disconnecting the device from the piping upon which it is mounted. Moreover by constructing the improved propelling device in such a manner that it is supported by the piping, or by a section of the pipe or main through which the flow of liquid normally takes place, the said propelling or circulating device may be attached to the pipe or main at any convenient point without regard to whether or not there is any convenient means for providing a fixed supporting foundation for a foundation plate.

Having thus described my invention I claim and desire to secure by Letters Patent:

1. In a liquid propelling device, the combination of a casing formed to be attached to pipes for the conveying of liquids, having a chamber formed to provide a direct conduit through it for the flow of liquids, and having inlet and outlet openings formed in one side; a by-pass chamber attached to said casing having inlet and outlet openings; bearings in the ends of said by-pass casing; a propeller shaft wholly supported by and rotatably mounted in said bearings; a propeller mounted on said shaft located in the by-pass chamber; means mounted on the outer end of said shaft for rotating the same; and a by-pass valve mounted to automatically close the direct flow liquid conduit when the propeller is operative and to automatically close the by-pass conduit when the propeller is inoperative.

2. In a liquid circulating device, the combination with a pipe section forming part of a conduit for the direct flow of the liquid, of a casing supported by said pipe section and the chamber of which has inlet and outlet openings communicating with the chamber of the said pipe section, and which casing is provided with bearings, the chamber of said casing forming a by-pass for the liquid, a rotary liquid-propelling device mounted in the said by-pass casing, a shaft by which said rotary liquid propelling device is carried and which rotates in said bearings in the said by-pass casing, and an automatic valve which is normally held so as to close a passageway from the by-pass casing to the said pipe section, but which will be automatically moved to a position to close the direct passageway through the pipe section and to open the passageway from the said by-pass casing when the said rotary liquid-propelling device is in operation.

3. In a liquid circulating device, the combination with a pipe section forming part of a conduit for the direct flow of the liquid, of a casing supported by said pipe section and the chamber of which has inlet and outlet openings communicating with the chamber of the said pipe section, and which casing is provided with bearings, the chamber of said casing forming a by-pass for the liquid, a rotary liquid-propelling device mounted in the said by-pass casing, a shaft by which said rotary liquid propelling device is carried and which rotates in said bearings in the said by-pass casing, a valve which is normally held so as to close a passageway from the by-pass casing to the said pipe section but which will be automatically moved to a position to close the direct passageway through the pipe section and to open the passageway from the said by-pass casing when the said rotary liquid-propelling device is in operation, and a visible index movable with said automatic valve.

4. In a fluid circulating device comprising a main or direct passageway for the normal flow of liquid, and a passageway for induced flow, the combination with a propeller rotatively mounted in the last-named passageway, of a valve arranged to open and close the said main or direct passageway and so positioned as to swing across and close the exit port from the induced-flow passageway when moved to open the said main or direct passageway, and a counterbalance for said valve to cause it to be held normally open in said main or direct passageway and in a position to close said port.

In testimony whereof, I have hereunto set my hand, in the presence of two subscribing witnesses, this the 7th day of July, A. D. 1908.

WILLIAM W. CASTLE.

Witnesses:
CHAS. W. WOLCOTT,
RICHARD P. ELLIOTT.